2,721,117
PRODUCTION OF CALCIUM ZIRCONATE

Robert A. Schoenlaub, Cleveland, Ohio, assignor, by mesne assignments, to Zirconium Corporation of America, Cleveland, Ohio, a corporation of Ohio No Drawing. Application September 29, 1951, Serial No. 249,010

4 Claims. (Cl. 23—16)

This application is a continuation-in-part of my co-pending application, Serial No. 657,057, filed March 25, 1946, which has issued as Patent No. 2,578,748, December 18, 1951.

This invention pertains to the extraction of zirconium from its ores and minerals. The invention relates particularly to the recovery of zirconium in the form of calcium zirconate.

Zirconium chemicals and compounds are difficult to extract from ores and minerals. The two principal ores are zircon and baddeleyite. These are refractory in respect to both temperature and chemical digestion. Two general methods have been used to make zirconium metals and salts. First, zircon or baddeleyite is fused with alkalies, fluorides or the like to render them susceptible to dissolution, the zirconium dissolved and purified by precipitation and resolution, fractional crystallization, etc. This usually gives basic zirconium chlorides, sulfates, nitrates or the hydroxide. Second, zirconium ores are heated for about 40 hours at 4000° F. usually with carbon. The impurities volatilize out having zirconium carbide or oxide which is then used as an intermediate to produce the various salts. Obviously such procedures are expensive and consume excessive labor, power or chemicals.

The present invention has for its principal object the provision of a simple method of removing from zirconium-containing ores and minerals the silica and other impurities and leaving a zirconium containing concentrate which is susceptible to chemical treatment. Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The objects of my invention are accomplished by adding to zircon enough CaO providing substance to form calcium zirconate and dicalcium silicate. A small excess of CaO may be used and if any $TiO_2$, $Al_2O_3$ and the like are present, enough additional CaO is used to combine therewith to form at least the metatitanate or aluminate. The reaction is as follows:

(1) $ZrO_2 \cdot SiO_2 + 3CaO \rightarrow 2CaO \cdot SiO_2 + CaO \cdot ZrO_2$

To this mixture, which is refractory, I may add fluorspar in partial replacement of CaO in which case reaction (2) proceeds simultaneously with reaction (1) with a great reduction in temperature.

(2) $2(ZrO_2 \cdot SiO_2) + 5CaO + CaF_2 \rightarrow$
$3CaO \cdot CaF_2 \cdot 2SiO_2 + 2(CaO \cdot ZrO_2)$ An excess of CaO does no harm and in many cases seems to be beneficial.

The mixture as for instance zircon, limestone and fluorspar, is heated until the reaction is complete and is preferably continued until the calcium zirconate has attained a grain size of at least 20 microns and preferably larger. The temperature may be as low as 2600° F. with fluorspar and as high as 3700° F. in its absence. Usually the reaction is operated at 2900° F. with actual fusion of the melt using fluorspar, or at 3200° F. in a rotary kiln with no fluxes.

The slag or clinker so formed consisting largely of dicalcium silicate normally dusts and liberates the calcium zirconate. In some instances, it may be necessary to lightly grind the slag to effect proper liberation. The calcium zirconate is then separated by its difference in size and its specific gravity, about 5, from the fine and light silicate flour. This can readily be done on a shaking table, air classifier and the like.

In many cases the product derived from physical separation is good enough for direct use. In other cases further purification may be required. Such a purification can be based upon the differential solubility of the silicates and the zirconate in dilute acids. Calcium zirconate is insoluble in dilute mineral acids, whereas the silicates and other impurities are easily soluble. The separation is accomplished by forming about a 1:10 slurry of the silicate-zirconate mixture in water and adding enough acid such as HCl, $H_2SO_4$ and the like to the slurry to react the silicates but not the zirconate, plus a ten per cent excess. This mixture is then blunged for 10 minutes more or less and the solution containing dispersed silica and dispersed or dissolved sulfates, chlorides, etc. removed from the residual zirconate. If desired, all impurities may be removed by said digestion. This procedure is the same as that described in my aforesaid application, Serial No. 675,057.

The calcium zirconate is then ready for use as such or for conversion to salts, metals, etc. This can be accomplished in many ways. For instance, calcium zirconate can be digested in hot concentrated acids and the basic salts prepared from the dissolved zirconia. Or the calcium zirconate may be heated with carbon and halogens to produce the tetrafluoride, chloride or iodide. In such a step the zirconium volatilizes and calcium remains behind. Also, it can be made into carbide by heating with carbon at temperatures of about 3800° F. for an hour. This is easy to do as it is not necessary to eliminate any silica and the power consumption is only about one-tenth that required in the usual carbide production. If the carbide is slaked in water, acetylene and calcium hydroxide forms, leaving a relative pure zirconium carbide for further processing.

This type of processing has a great advantage in its low cost and the ease by which it is adaptable to large scale production, and through its use of non-critical equipment and materials.

As an example of the invention, the following may be given:

One hundred parts of zircon (66% $ZrO_2$ and 33% $SiO_2$), 150 parts of limestone (CaO 55%) and 13.7 parts of fluorspar, are mixed and fired to 2912° F. for four hours in graphite. The mixture is then cooled and allowed to dust. The −10 micron silicate is removed by classification, leaving 120 parts of calcium zirconate and its associated impurities and about 73 parts of a tailing which is substantially calcium silicate. This zirconate is slurried in 1200 parts of water and 70 parts of commercial hydrochloric acid added. The resultant slurry is agitated vigorously for fifteen minutes and the residual calcium zirconate separated. The zirconate is dried and found to comprise 90 parts of zirconate product of the following composition:

| | Percent |
|---|---|
| $SiO_2$ | .97 |
| $Zr_2O_3$ | 69.47 |
| CaO | 28.72 |
| $Fe_2O_3$ | .39 |
| $Al_2O_3$ | .16 |

The reaction of calcium oxide with zircon to form calcium zirconate and dicalcium silicate in physically and chemically separable form is a function of both temperature and time. The reaction is essentially a refractory one which must be forced by high temperatures. If the maximum use is made of fluxes such as barium oxide, strontian oxide, fluorspar and the like, the reaction may be made to occur as low as 2600° F., but at that temperature considerable time will be required for completion of the reaction. There seems to be no upper limit for the temperature at which the reaction can be made to occur, but when the temperatures exceed about 3600° F. the rate of volatilization of the constituents becomes so rapid that chemical control is difficult. Since the reaction proceeds rapidly to completion in a very short time at temperatures in the neighborhood of 3600° F. and below, there is no need to go to the higher temperatures which are always attended with increased cost. The optimum temperature is about 3300° F., from the standpoint of cost, completion of the reaction at a reasonable time, and ease of control.

Most of these reactions occur in the solid state or through vapors in minor amounts of liquids. On cooling below about 3000° F. the mixtures become a solid crystalline body and no advantage is obtained by slow cooling with the possible exception that if dusting bodies are desired, better disintegration is obtained if the bodies are cooled from about 3000° F. to about 1200° F. over a period of at least a half hour.

While, as explained above, it is preferable to utilize calcium oxide other materials can be used in part in an ancillary manner. In general bases stronger than CaO substitute for CaO in the silicate but not in the zirconate and may be used in partial replacement of CaO. These stronger bases are $K_2O$, $Na_2O$, BaO and SrO. $Na_2O$ and $K_2O$ have dubious value because they are evanescent at maturation temperatures. BaO acts as a flux changing the chemical composition of the silicate and reducing its fusion temperature and may be used advantageously up to about a 10% molecular replacement of CaO. Strontium oxide may be similarly used, but is much less effective.

The bases which are weaker than CaO comprising MnO, MgO, FeO, ZnO, etc. may be used. Some of them (MnO, FeO, CoO and NiO) have a pronounced coloring effect upon products. ZnO and CdO are volatile. Most of these are compatible with both dicalcium silicate and calcium zirconate and will not interfere with the primary reactions. However, they will not provide much assistance as fluxes or mineralizing agents. Raw materials or special circumstances may make their presence unavoidable. Whereas the stronger bases do enter into the reaction as by combining with at least some of the silica of the zirconium ore and accordingly their presence should be thus recognized and accounted for in calculating the amount of CaO used, this is not true of the bases which are weaker than CaO and which do not enter into the reaction.

Fluxes have been mentioned above and have been discussed to some extent. Since this reaction is a solid state reaction, they can be very useful. The best fluxes or mineralizers are the fluorides. They quickly bring the mixture to equilibrium at moderate temperatures. Fluorspar used in molecular replacement of up to about 20% of the calcium oxide will cause the reaction quickly to come to equilibrium at about 2900° F. Also fluorspar when properly used seems to promote dusting of the slag. Sodium chloride and sodium carbonate also promote and aid dusting but do not materially affect the maturation temperature. The other oxides mentioned above can be used to some extent but their effect, as fluxes, is not as pronounced or helpful, so that when a simple fluxing effect is desired, best results will be achieved by the use of fluorspar. Of the oxides previously mentioned which have a fluxing effect, barium oxide which we previously discussed seems to be the best.

Wherever reference is made herein to calcium zirconate, the product intended has the following formulae $CaO.ZrO_2$; contains 31.5% CaO, 68.5% $ZrO_2$. Orthorhombic system, 100, 010, 001, 111 faces. Cleavage. Index of refraction 2.02, 2.15, 2.05. Density 5.7.

Other modes of applying the principle of the invention may be employed, change being made as regards the details described, provided the features stated in any of the following claims or the equivalent of such be employed.

I, therefore, particularly point out and distinctly claim as my invention:

1. The process of producing calcium zirconate which comprises forming an admixture of zirconium ore and enough CaO to provide at least two molecules of such CaO for each molecule of $SiO_2$ in the ore plus one molecule of CaO for each molecule of $ZrO_2$ present, subjecting such admixture to solid state reaction by heating such mixture to from 2600° to about 3600° F., for a time sufficient to form dicalcium silicate and physically separable crystals of calcium zirconate, cooling the fired mass and then separating calcium zirconate as such therefrom.

2. A process according to claim 1 characterized further in that the CaO used has been replaced up to less than 20% thereof, by a flux.

3. A process according to claim 1 characterized further in that the CaO used has been replaced up to less than 20% thereof, by fluorspar.

4. The process of producing calcium zirconate which comprises forming an admixture of zirconium ore and enough CaO to provide at least two molecules of such CaO for each molecule of $SiO_2$ in the ore plus one molecule of CaO for each molecule of $ZrO_2$ present, subjecting such admixture to solid state reaction by heating such mixture to from about 2600° to about 3600° F., for a time sufficient to form dicalcium silicate and physically separable crystals of calcium zirconate crystals of at least 20 microns, cooling the fired mass and then separating calcium zirconate as such therefrom.

References Cited in the file of this patent

UNITED STATES PATENTS

| | | |
|---|---|---|
| 1,681,195 | Rusberg | Aug. 21, 1928 |
| 2,213,168 | Monk et al. | Aug. 27, 1940 |
| 2,578,748 | Schoenlaub | Dec. 18, 1951 |

OTHER REFERENCES

Mellor: Comprehensive Treatise on Inorganic and Theoretical Chemistry. Longmans, Green and Co., New York, 1927, page 136.